(12) United States Patent
Hasama

(10) Patent No.: US 10,088,982 B2
(45) Date of Patent: Oct. 2, 2018

(54) INFORMATION PROCESSING APPARATUS, METHOD, AND PROGRAM

(71) Applicant: CANON KABUSHIKI KAISHA, Tokyo (JP)

(72) Inventor: Yuichi Hasama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 310 days.

(21) Appl. No.: 14/373,800

(22) PCT Filed: Dec. 5, 2012

(86) PCT No.: PCT/JP2012/007804
§ 371 (c)(1),
(2) Date: Jul. 22, 2014

(87) PCT Pub. No.: WO2013/111233
PCT Pub. Date: Aug. 1, 2013

(65) Prior Publication Data
US 2015/0012882 A1      Jan. 8, 2015

(30) Foreign Application Priority Data
Jan. 25, 2012   (JP) ................................ 2012-013040

(51) Int. Cl.
*G06F 3/0481*   (2013.01)
*G06F 3/0484*   (2013.01)
(Continued)

(52) U.S. Cl.
CPC .......... *G06F 3/0484* (2013.01); *G06F 3/0481* (2013.01); *G06F 3/0488* (2013.01);
(Continued)

(58) Field of Classification Search
CPC .. G06F 17/243; G06F 3/04812; G06F 3/0484; G06F 3/0488; G06F 3/1285; G06F 21/608
See application file for complete search history.

(56) References Cited

U.S. PATENT DOCUMENTS 6,574,002 B1 *  6/2003  Paczewitz ............. G06F 3/1205
                                                                        358/1.1
8,487,883 B2 *  7/2013  Kao ....................... G06F 3/0483
                                                                        345/156
(Continued)

FOREIGN PATENT DOCUMENTS

CN    101018158 A    8/2007
CN    100373322 C    3/2008
(Continued)

OTHER PUBLICATIONS stackexchange.com Definition of Toast Notification.*
(Continued)

*Primary Examiner* — Steven Sax
(74) *Attorney, Agent, or Firm* — Canon U.S.A., Inc. IP Division

(57) ABSTRACT

An information processing apparatus employs an operating system providing a first user interface (UI) environment appropriate for a touch panel and a conventional desktop UI environment, and, according to display of a pop-up dialog associated with secure print function of a printer driver in the desktop UI environment, if a toast prompting a user to change display from the first UI environment to the second UI environment is displayed for a predetermined period of time by the OS in the first UI environment, and, if a user's operation on the dialog is not performed for a predetermined period of time in the desktop UI environment, the printer driver deletes the dialog and displays the dialog again.

6 Claims, 12 Drawing Sheets

(51) Int. Cl.
    *G06F 3/12*     (2006.01)
    *G06F 21/60*     (2013.01)
    *G06F 3/0488*     (2013.01)

(52) U.S. Cl.
    CPC .......... *G06F 3/1222* (2013.01); *G06F 3/1238* (2013.01); *G06F 3/1254* (2013.01); *G06F 3/1285* (2013.01); *G06F 21/608* (2013.01)

(56) References Cited

U.S. PATENT DOCUMENTS

| | | | | |
|---|---|---|---|---|
| 9,164,714 | B2* | 10/2015 | Kikuchi | G06F 3/1222 |
| 2002/0178077 | A1* | 11/2002 | Katz | G06Q 10/0637 |
| | | | | 705/7.36 |
| 2003/0033179 | A1* | 2/2003 | Katz | G06Q 10/063 |
| | | | | 705/7.12 |
| 2003/0214666 | A1 | 11/2003 | Osada | |
| 2004/0250137 | A1* | 12/2004 | Takahashi | H04L 63/08 |
| | | | | 726/4 |
| 2007/0073592 | A1* | 3/2007 | Perry | G06Q 30/0603 |
| | | | | 705/26.1 |
| 2007/0211310 | A1* | 9/2007 | Kadota | H04N 1/00344 |
| | | | | 358/474 |
| 2007/0253424 | A1* | 11/2007 | Herot | H04L 12/1818 |
| | | | | 370/395.2 |
| 2007/0283280 | A1* | 12/2007 | Butlin | G06F 8/38 |
| | | | | 715/757 |
| 2008/0163123 | A1* | 7/2008 | Bernstein | G06F 3/0481 |
| | | | | 715/853 |
| 2008/0284754 | A1 | 11/2008 | Kao et al. | |
| 2010/0138780 | A1 | 6/2010 | Marano | |
| 2011/0074710 | A1* | 3/2011 | Weeldreyer | G06F 3/0481 |
| | | | | 345/173 |
| 2011/0078624 | A1* | 3/2011 | Missig | G06F 3/04883 |
| | | | | 715/802 |
| 2012/0124487 | A1* | 5/2012 | Edgar | G06Q 10/10 |
| | | | | 715/760 |
| 2012/0133601 | A1* | 5/2012 | Marshall | G06F 19/321 |
| | | | | 345/173 |
| 2012/0198547 | A1* | 8/2012 | Fredette | G06F 8/34 |
| | | | | 726/19 |
| 2012/0212758 | A1* | 8/2012 | Eom | G06F 3/1204 |
| | | | | 358/1.13 |
| 2013/0003953 | A1* | 1/2013 | Okubo | H04M 1/7255 |
| | | | | 379/93.17 |
| 2014/0007019 | A1* | 1/2014 | Saukko | G06F 3/0484 |
| | | | | 715/863 |

FOREIGN PATENT DOCUMENTS

| | | |
|---|---|---|
| JP | 11-338599 A | 12/1999 |
| JP | P2001-318779 A | 11/2001 |
| JP | P2010-128539 A | 6/2010 |

OTHER PUBLICATIONS

UI Design and Interaction Guide for Windows Phone 7 Jul. 7, 2010 Version 2.0, Jul. 31, 2010 (Jul. 31, 2010), XP055215936, Retrieved from the Internet: URL:http://www.codefest.at/file.axd?file=2010/9/UIDesign and Interaction Guide for Windows Phone 7 v2.0.pdf, [retrieved on Sep. 24, 2015].

\* cited by examiner

INFORMATION PROCESSING APPARATUS, METHOD, AND PROGRAM

TECHNICAL FIELD

The present invention relates to a technique useful for print processing performed by an information processing apparatus.

BACKGROUND ART

A printer is generally controlled by software called a printer driver, which runs on a client computer. The printer driver has two major functions. One function allows the user to perform print setting. Generally, a user interface (UI) is provided for this function. The other function is used for converting a rendering instruction sent from an application into print data (page description language (PDL)), which can be interpreted by the printer, and transmitting the data to the printer. These functions are realized in cooperation with an operating system (OS) of the client computer.

Further, the printer driver has a function called secure print, which is discussed in Japanese Patent Application Laid-Open No. 2001-318779. This function allows the user to input a password before the user performs printing using the printer. When the user gives a print instruction, the printer driver automatically displays a pop-up dialog prompting the user to input a password on the screen of the client computer. The secure print is realized when the input information is added to the print data.

When specifications of an OS that cooperates with the printer driver are changed, in general, the user may find difficulty in using the functions realized by the printer driver or may not be able to use the functions. Specifications of the OS change when, for example, an OS employing a new UI optimized for touch-panel devices, such as a smartphone, is used. When such a new OS is used, not all of the functions of the UI realized by the printer driver for the old OS are supported by the new UI. The functions not supported by the UI, for example, may be executed on a different screen provided for the old application. As for the exceptional functions such as the UI functions (e.g., an automatic pop-up dialog of the above-described secure print), their usability is not fully considered for the new OS.

As examples of similar exceptional UI functions of a printer driver, there are a dialog requesting for department information for departmental management, and designation of a file path when a file storage setting is designated. A similar UI function is used for address designation in a facsimile driver.

SUMMARY OF INVENTION

The present invention is directed to an information processing apparatus, which enables a user to use a function of a printer driver, such as secure print, more easily and appropriately when necessary information needs to be input on a pop-up dialog even if the OS is a new OS, such as the one described above.

According to an aspect of the present invention, an information processing apparatus including a control unit configured to execute an operating system (OS) providing a first user interface (UI) environment appropriate for a touch panel and a second UI environment different from the first UI environment, and a control program for controlling an image forming apparatus includes a control unit configured to perform a pop-up display of a dialog in the second UI environment as a function of the control program according to execution of request for the image forming apparatus, wherein, as a function of the OS, according to the pop-up display of the dialog in the second UI environment, in the first UI environment, a toast display prompting a user to change display from the first UI environment to the second UI environment is displayed for a predetermined period of time, and wherein, if an operation by a user on the dialog is not performed for a predetermined period of time in the second UI environment, the control means deletes the dialog displayed on the pop-up display in the second UI environment and displays the dialog again.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

Figure 1:
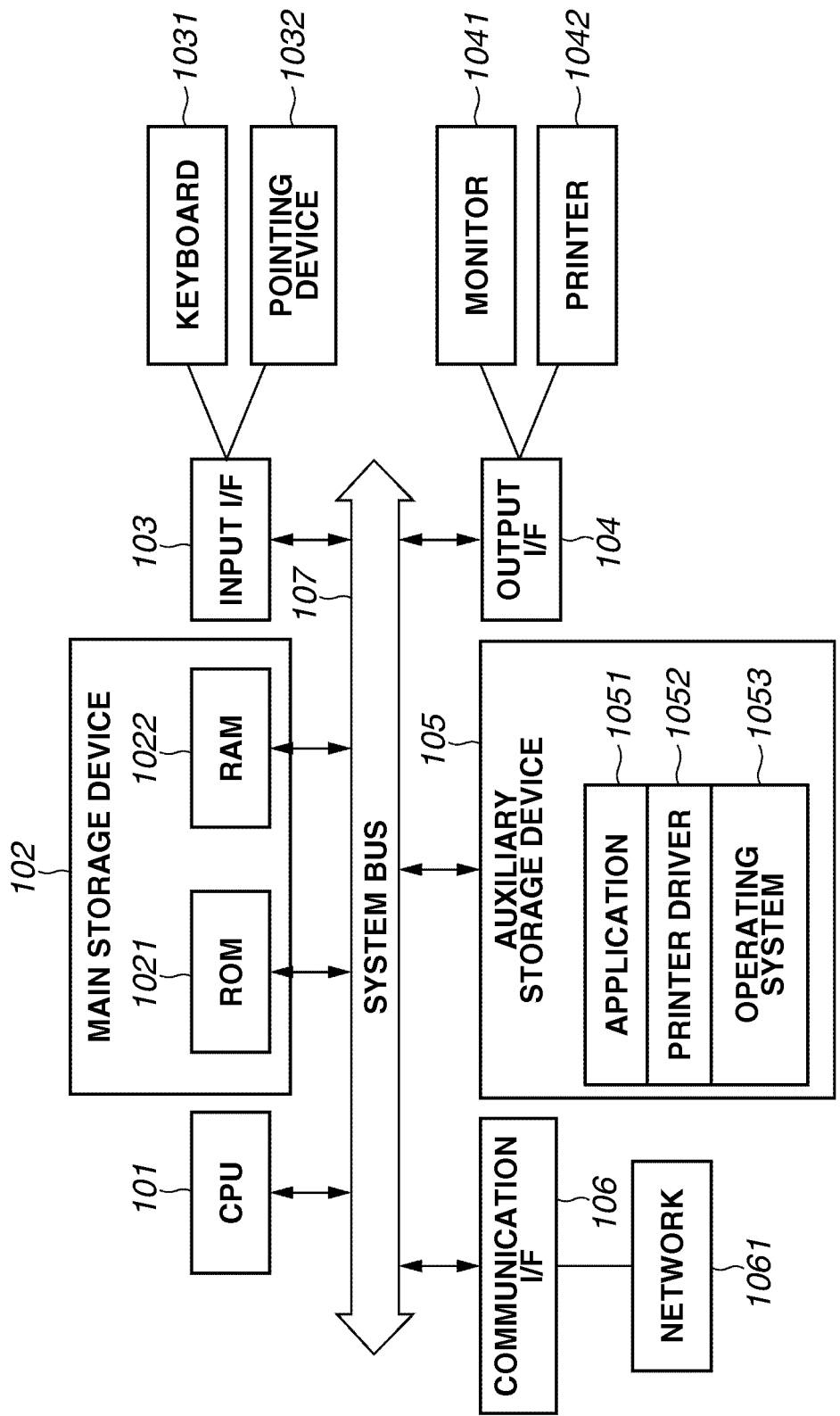
FIG. 1 illustrates a configuration example of hardware and software of an information processing apparatus according to a first exemplary embodiment of the present invention.

First, a first exemplary embodiment of the present invention will be described. FIG. 1 illustrates a configuration example of hardware and software of an information processing apparatus according to the present invention. The information processing apparatus includes, for example, a client computer. A printer driver runs on the client computer. Except where specifically noted, if a function of the exemplary embodiments of the present invention is executed, the exemplary embodiments of the present invention can be applied not only to a single apparatus but to a system including a plurality of apparatuses, or to a system which is connected to a network.

In FIG. 1, a CPU 101 executes a program stored in a ROM 1021 or a RAM 1022 in a main storage unit 102, or stored in an auxiliary storage unit 105 to control the entire information processing apparatus. The RAM 1022 is used as a work area when the CPU 101 performs various types of processing. The auxiliary storage unit 105 stores various programs including an operating system (OS) 1053 and an application 1051.

Input devices, such as a keyboard 1031 and a pointing device 1032 like a mouse or a touch-panel, are devices which the user uses when the user sends out various instructions to a client computer via an input interface (I/F) 103. An output I/F 104 is an interface used for outputting data to an external device. For example, the output I/F 104 outputs data to an output device, such as a monitor 1041 or a printer 1042. Although the information processing apparatus is directly connected to the printer 1042 in FIG. 1 via a local input/output (I/O) line, the information processing apparatus may be connected to the printer 1042 via a communication I/F 106 and a network 1061. Further, the interfaces and the modules of the information processing apparatus exchange data via a common data system bus 107.

Figure 2:
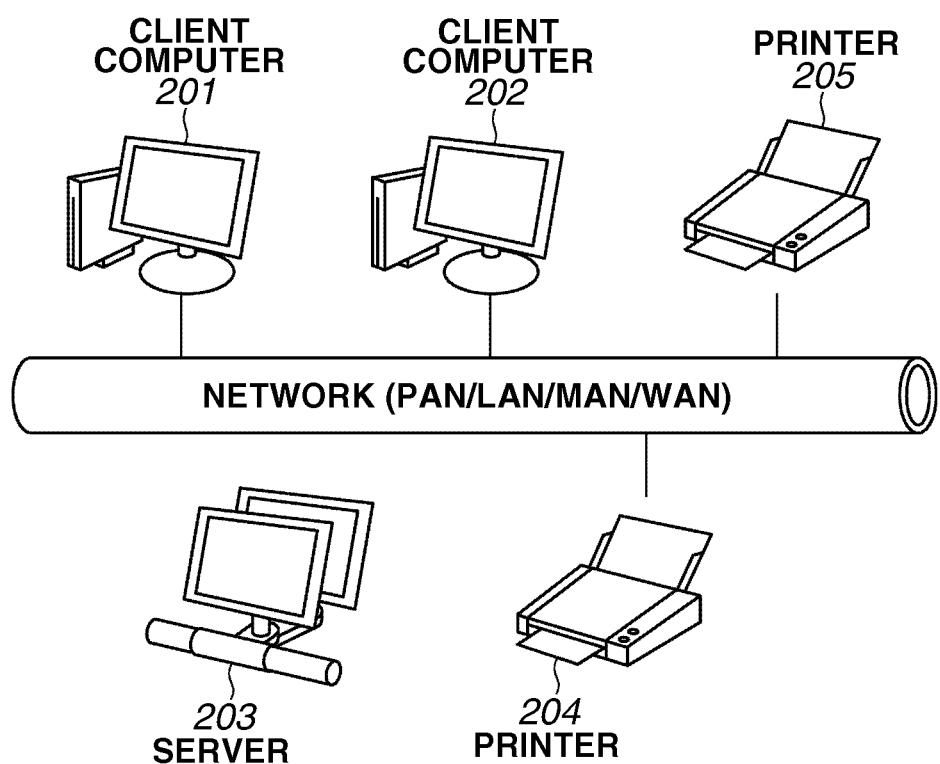
FIG. 2 illustrates a configuration example of a network according to the first exemplary embodiment of the present invention.

FIG. 2 illustrates a configuration example of a network applicable to the present exemplary embodiment. Client computers 201 and 202, which provide print instructions, and printers 204 and 205 are connected to one or a plurality of networks. Further, a server computer 203, which manages the client computers and the printers, can be connected to such networks. Although the printer 205 is physically connected to the network, if the printer is in an offline state, the printer 205 cannot be actually used. A variety of networks, from small scale to large scale networks, are included in the above-described networks. The networks are, for example, a local area network (LAN) and a wide area network (WAN). All the apparatuses in FIG. 2 are connected to all the networks. The server and the printers may be connected via the Internet by the use of, for example, cloud computing.

Figure 3:
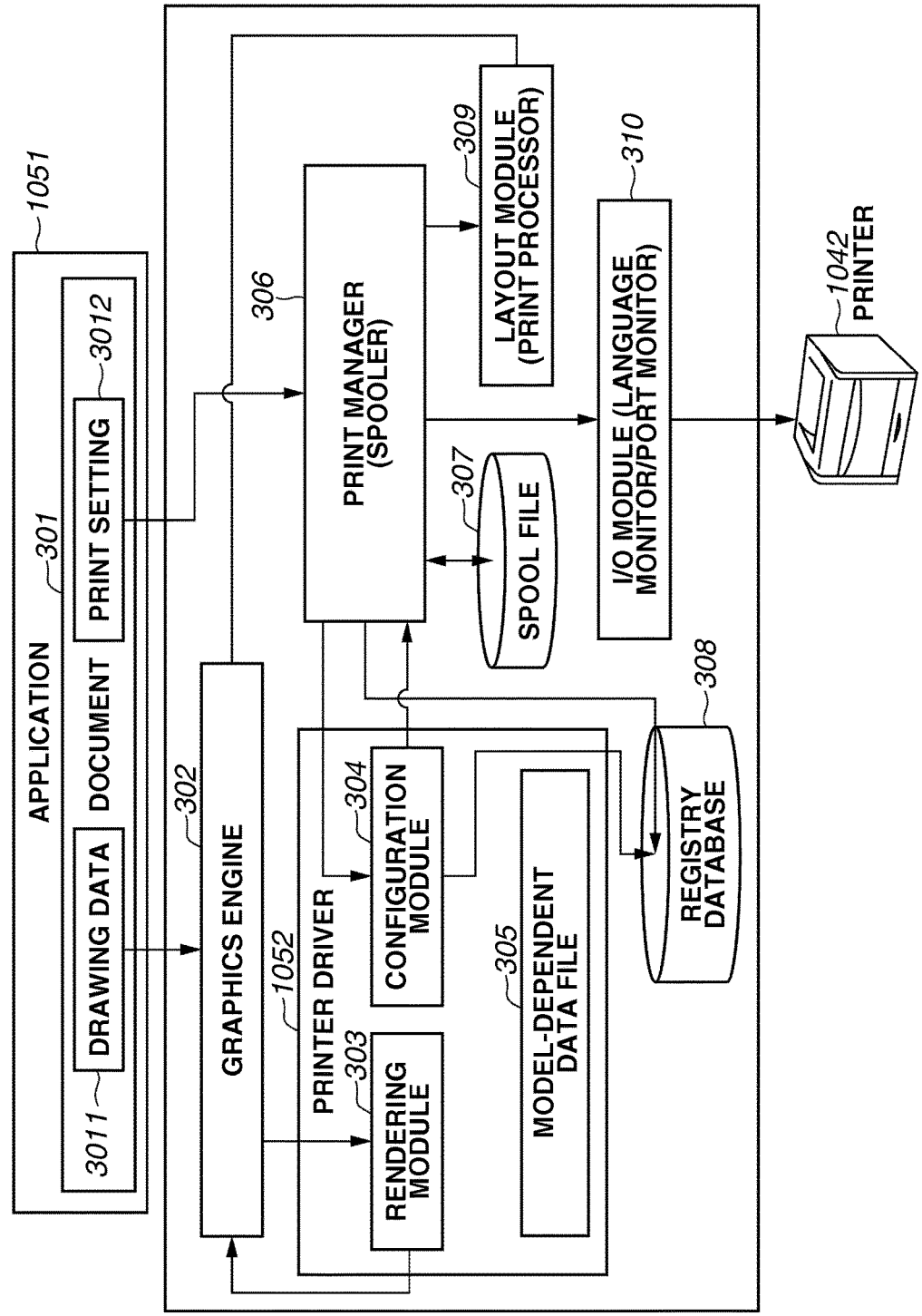
FIG. 3 illustrates a configuration example of a print processing system of a client computer according to the first exemplary embodiment of the present invention.

FIG. 3 illustrates an example of a print processing system of the information processing apparatus. The application 1051, a printer driver 1052, and the OS 1053 are stored in the auxiliary storage unit 105. A graphics engine 302 and a print manager 306 are logic modules provided as the functions of the OS 1053.

When the user prints a prepared document 301, the user gives an instruction to the information processing apparatus by using the UI of the application 1051 displayed on the monitor 1041 with an input device such, as the keyboard 1031 or the pointing device 1032. The print processing is executed by performing three types of processing, which are selecting the printer, generating the print setting, and converting drawing data 3011.

Regarding the selection of the printer, the user selects an icon corresponding to the printer which the user desires to use. In FIG. 3, the printer driver 1052 is the printer driver for the printer 1042, which has been selected by the user. The printer driver 1052 is associated with the icon when it is installed in the client computer.

Regarding the generation of the print setting, the function of the printer driver 1052 is used. First, an initial value is generated by a configuration module 304. Then, by using a user interface (UI) of the application 1051 or the printer driver 1052, the user changes the setting as appropriate and determines print setting 3012. For example, the user changes the size of the paper to be output, or designates two-sided printing or monochrome/color printing.

The user interface of the printer driver 1052 is provided by the configuration module 304. The print setting 3012 is reserved on the RAM 1022. The format of the print setting 3012 includes, for example, binary data structure or XML being a markup language. The format depends on the specification of the printer driver 1052 and the OS 1053. Further, the print setting 3012 is generated each time a document is printed. However, useful information such as optional device configuration of the printer 1042 and environment settings set for each user are stored in a registry database 308 of the OS 1053 by the printer driver 1052. Further, default values of the print setting 3012 for each user are stored in the registry database 308 by the print manager 306 of the OS 1053.

Next, conversion of the drawing data 3011 will be described. If print processing is executed by the user after the generation of the print setting 3012, the application 1051 notifies the OS 1053 of printing start. Then, print data is generated by the printer driver 1052, which has been designated, via the graphics engine 302 of the OS 1053. If layout processing is designated by the print setting 3012, a spool file 307, which is a temporary file, is generated before the data is processed by a rendering module 303 of the printer driver 1052. Then, a layout module 309 starts layout processing, which includes arranging the paper order and making arrangements for the N-up printing. After the layout is changed by the layout module 309, the rendering module 303 of the printer driver 1052 converts the drawing data 3011 into Page Description Language (PDL) data, which can be understood by the printer. When the drawing data 3011 is converted into PDL data, the print setting 3012 is also converted into PDL data. In many cases, both the rendering module 303 and the configuration module 304 are common modules, which can be used by a plurality of types of printers (the printers 1042). The difference between the models is described in a model-dependent data file 305. The rendering module 303 and the configuration module 304 refer to this model-dependent data file 305 as appropriate. The data which has been converted is sequentially stored as the spool file 307. The print manager 306 acquires the spool file 307 and manages schedules of the print processing as a print job. If the state of the printer 1042 is changed and the printer is ready for printing, the print manager 306 transmits the print job to the printer 1042 via an I/O module 310. In this manner, the data provided by the application is transmitted to the printer as a print job and printing is executed.

Figure 5:
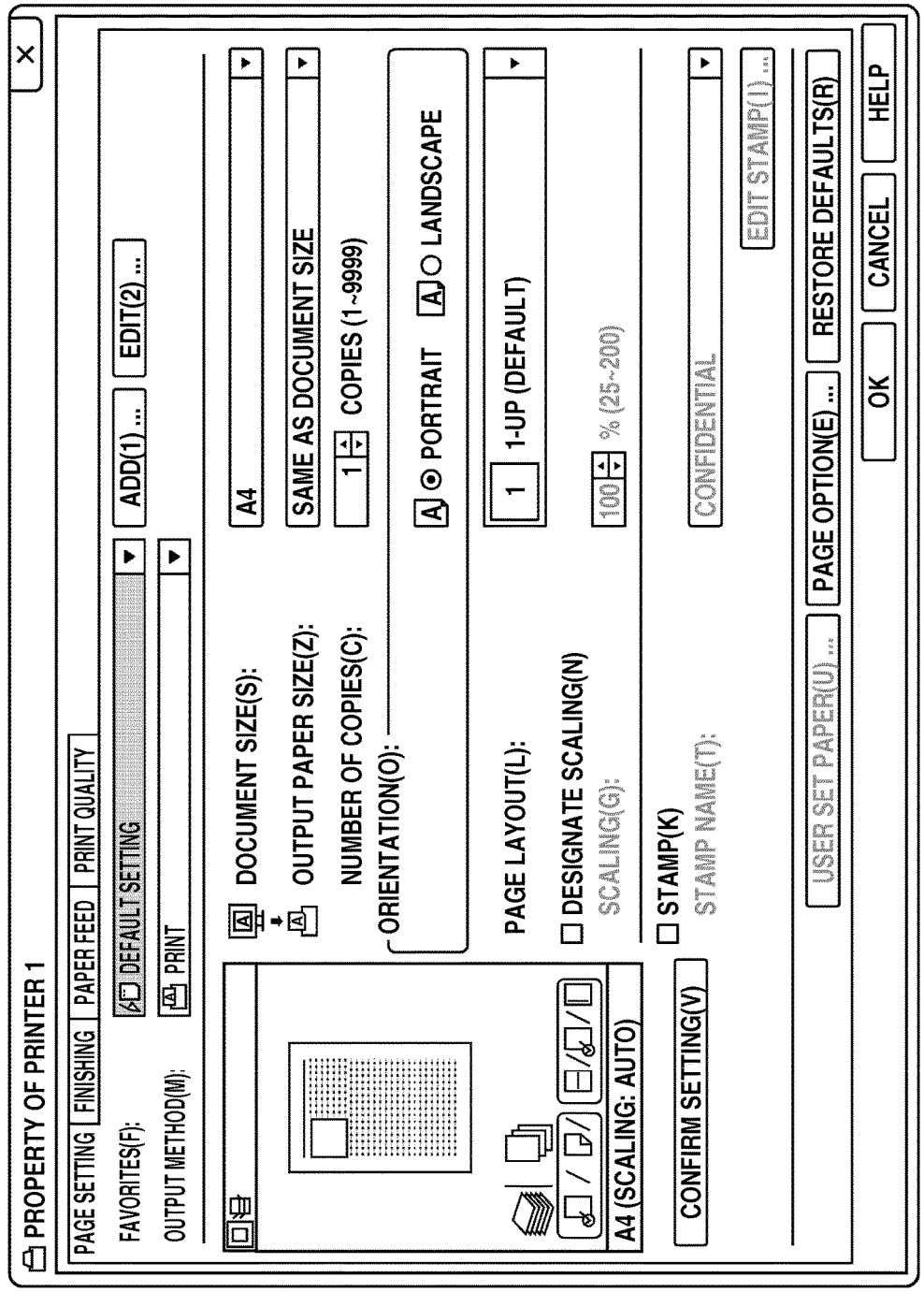
FIG. 5 illustrates an example of a user interface for print setting provided by a printer driver according to the first exemplary embodiment of the present invention.

In generating the print setting 3012 of a document 301 illustrated in FIG. 3, the print setting 3012 is directly rewritten by the application 1051. Further, the print setting 3012 may be generated using a user interface. The user interface is provided by the configuration module 304 of the printer driver 1052. FIG. 5 illustrates an example of a user interface provided by the configuration module 304 of the printer driver 1052.

Figure 4:
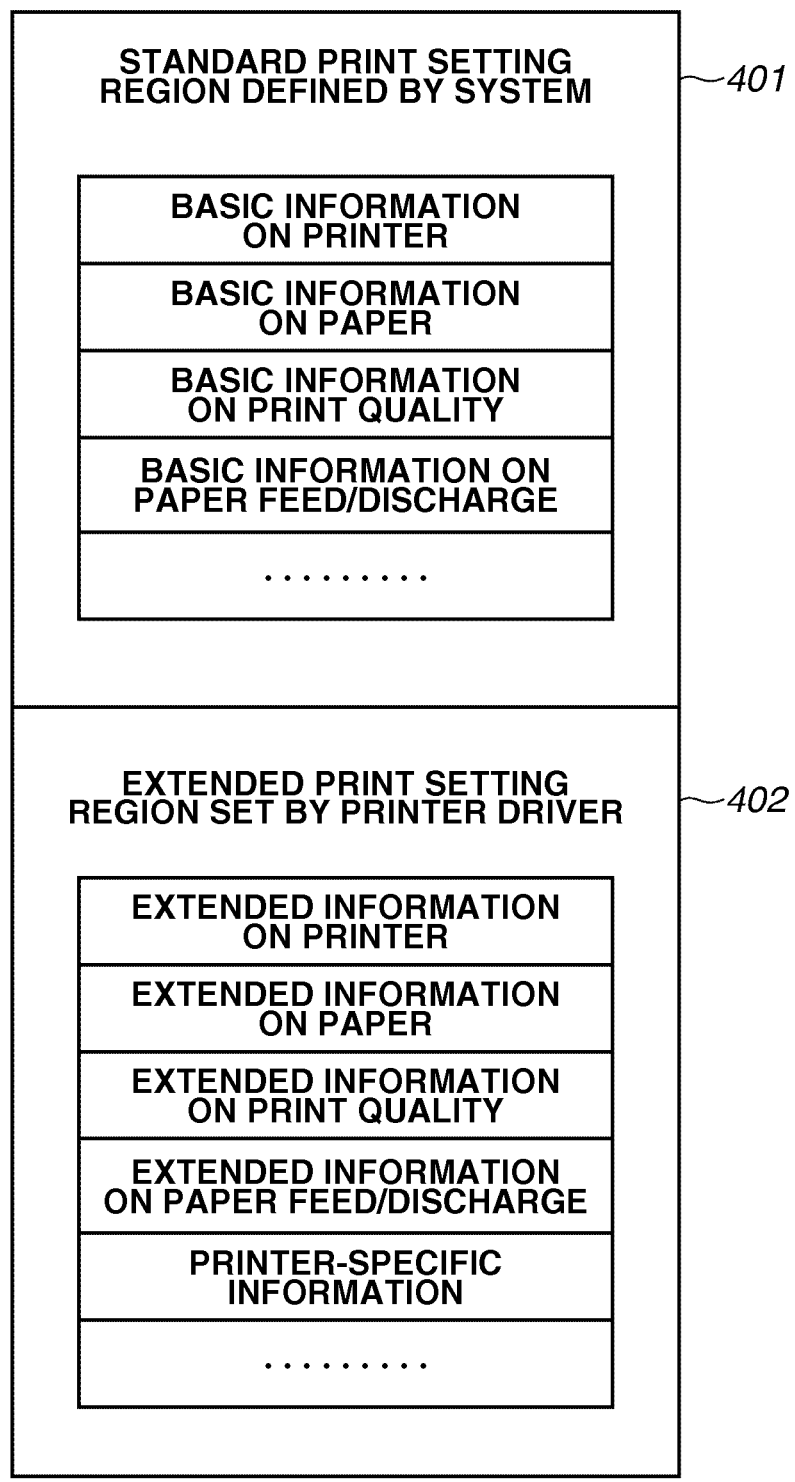
FIG. 4 illustrates a data structure of a DEVMODE structure according to the first exemplary embodiment.

The print setting 3012 has a structure called a DEVMODE structure if the OS is Microsoft (registered trademark) Windows (registered trademark). The DEVMODE structure is illustrated in FIG. 4. The DEVMODE structure includes two regions being a standard setting region 401 and an extended setting region 402. The standard setting region 401 is publicly defined by the OS and the setting region 402 is a region extended by the printer driver. Various basic print settings including paper size, paper-feed stage, and color/monochrome printing can be set in the standard setting region 401. On the other hand, optional settings associated with a discharge function and a fine color adjustment function of the printer are set in the extended setting region 402. Since information of the extended settings of the printer driver 1052 is not provided to the application 1051, the application 1051 can only change the print settings set in the standard setting region 401 defined by the system. Thus, generally, the application 1051 causes the printer driver 1052 to display a user interface, so that the user can set the print settings for the extended setting region 402.

The configuration module 304 provides not only the user interface but also an application programming interface (API). Thus, it is possible to set the print settings for the extended setting region 402 from an external apparatus without displaying the user interface. However, if an API of the configuration module 304 is used, since the application needs to correspond to the printer driver 1052, only the standard setting region 401 can be changed by a common application.

Next, the OS 1053 described above with reference to FIG. 1 will be described in detail together with the issues to be solved by the present invention.

In recent years, mobile terminals (e.g., cellular phones) and tablet computers including a touch-panel are widely used. Since these devices are operated by touching the screen, the UI environment of the OS of these devices is optimized for a touch-panel. A UI for such a UI environment (hereinafter, referred to as a touch-panel UI) is different from a UI for an environment optimized for, for example, the conventional Windows (registered trademark) XP (hereinafter, referred to as a desktop UI).

Figure 9:
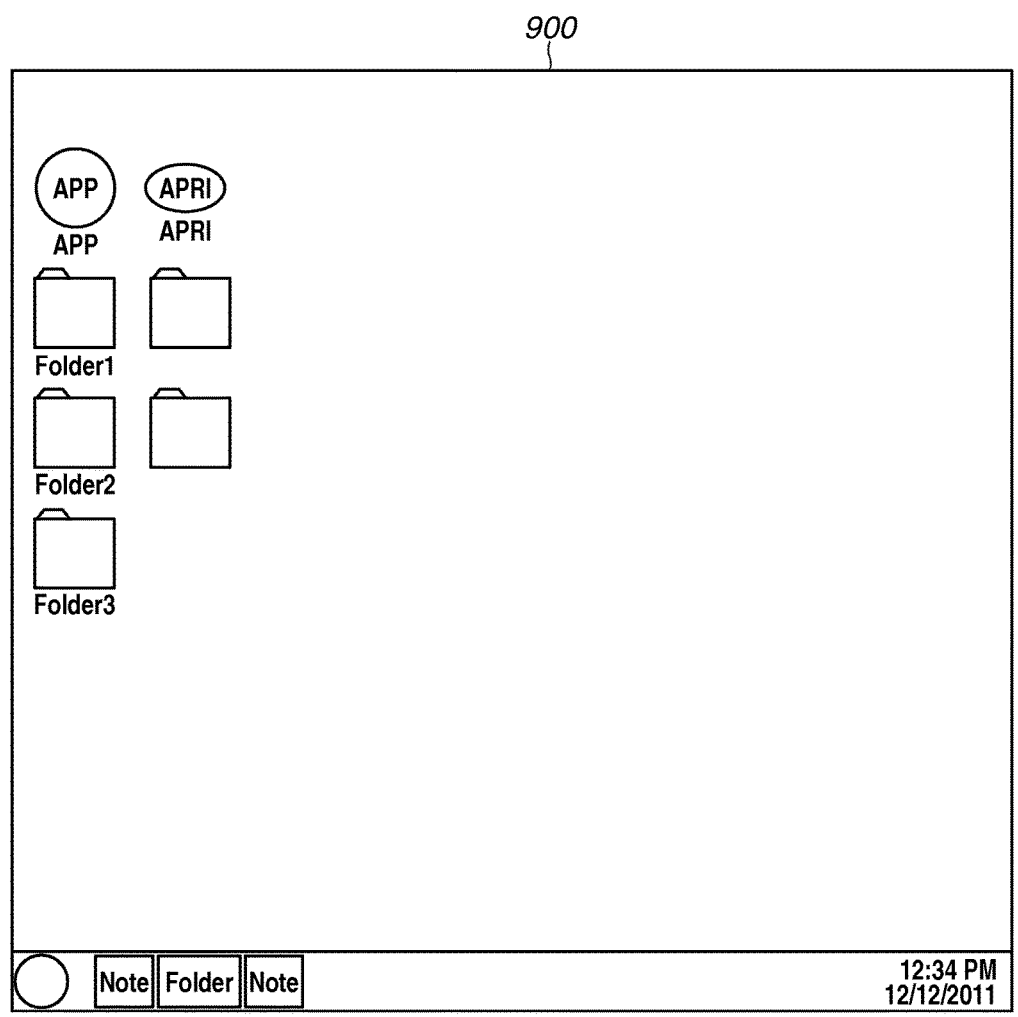
FIG. 9 illustrates an example of a desktop user interface according to the first exemplary embodiment of the present invention.

FIG. 9 illustrates an example of a desktop UI. The conventional UI screen (FIG. 5) for a printer driver is displayed in such a UI environment.

Figure 10:
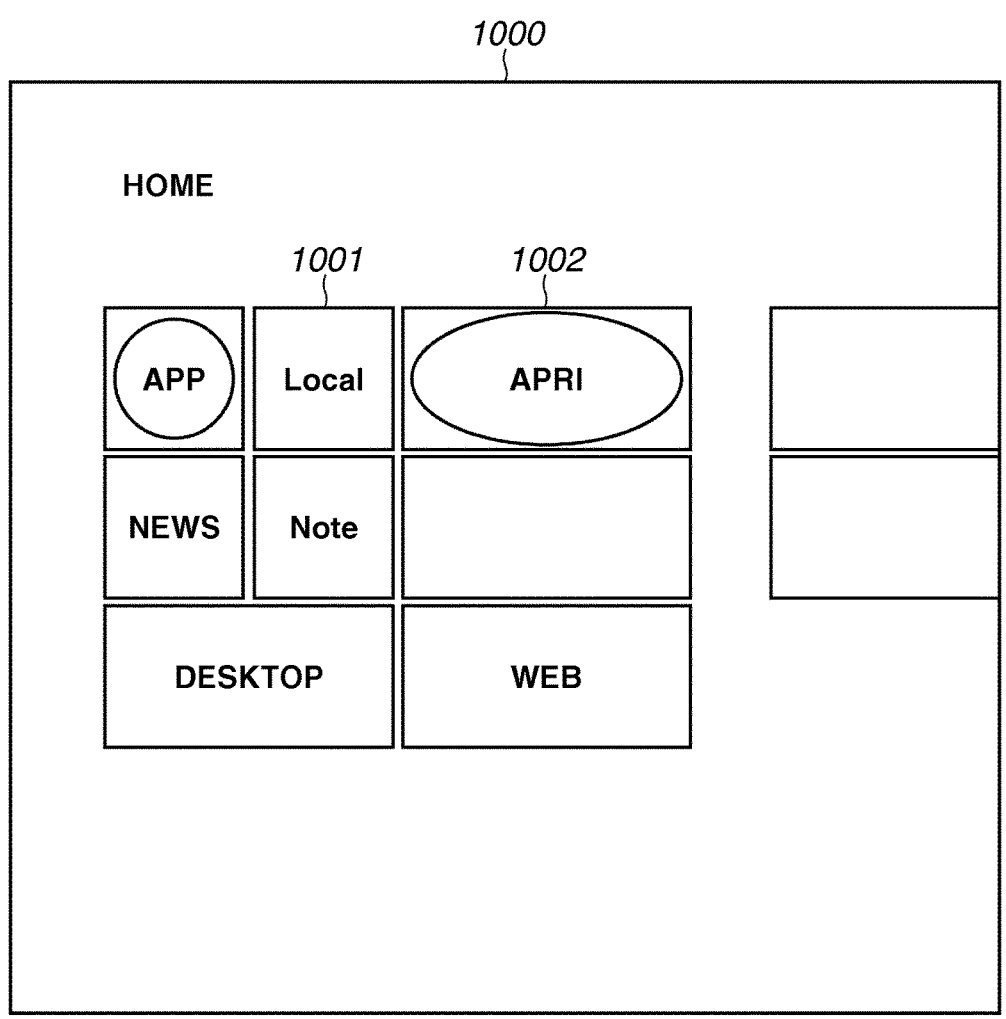
FIG. 10 illustrates an example of a touch-panel user interface according to the first exemplary embodiment of the present invention.

FIG. 10 illustrates an example of a touch-panel UI. In FIG. 10, the size of the buttons (e.g., buttons 1001 and 1002) of a touch-panel UI 1000 is optimized for use with a finger.

An OS that can manually change the display from the touch-panel UI 1000 to a desktop UI 900 is being developed. In generating an application that runs on such an OS, a different package needs to be prepared for each UI environment.

According to the information processing apparatus of the present invention, the OS 1053 can change the display from the touch-panel UI 1000 to the desktop UI 900 and vice versa.

When a print request from a document application that conforms to the touch-panel UI 1000 is received when the OS 1053 is running, the user can manually change the UI screen for the touch-panel UI 1000 to the UI screen for the printer driver 1052 (see FIG. 5) that conforms to the environment of the desktop UI 900 since they have compatibility. Accordingly, the user can use the printer driver 1052, which is designed for the conventional UI environment, and perform printing even if the OS 1053 is running.

However, if a UI 500 of a printer driver that assumes such a conventional UI environment is displayed, although the necessary content is displayed, the operability is not good. This is because the buttons for the conventional UI environment are generally used with a mouse and a keyboard and are too small for a user that uses a finger.

Figure 11:
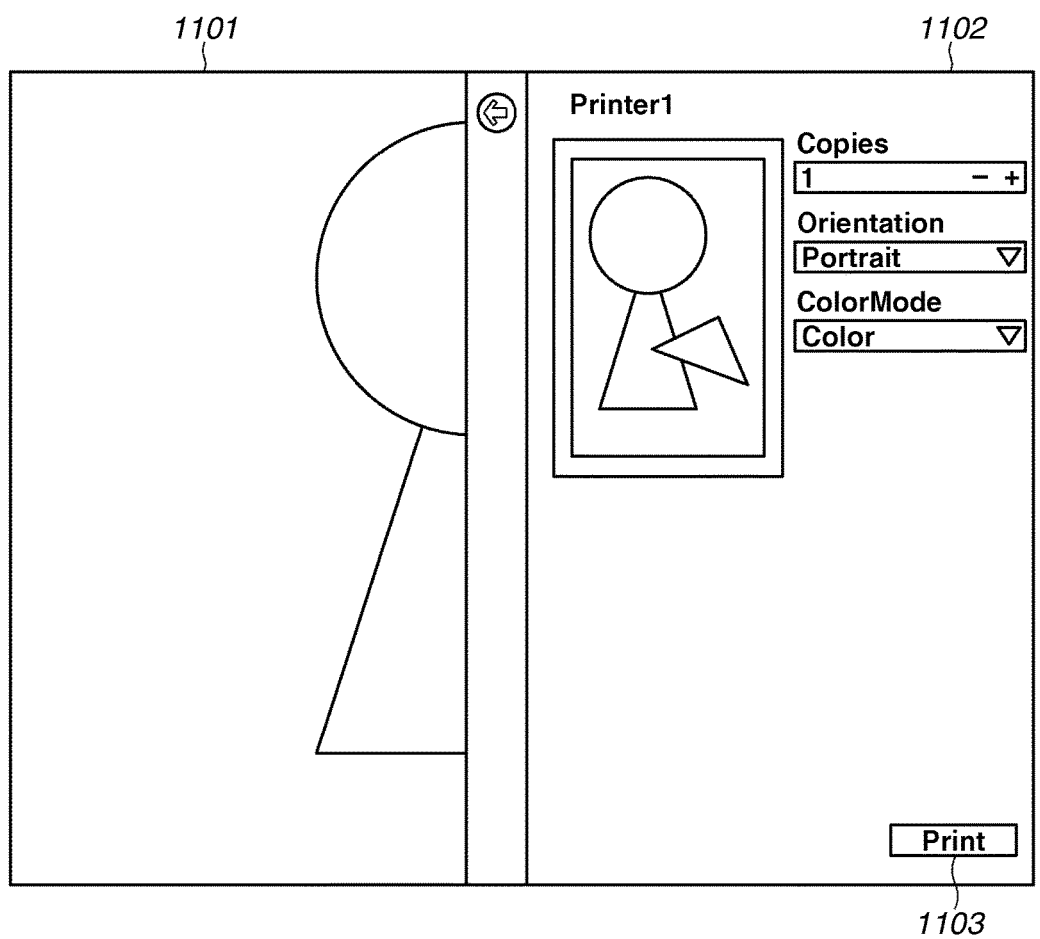
FIG. 11 illustrates an example of a user interface automatically generated by an OS based on an application for the touch-panel UI and metadata in an extensible markup language (XML) format according to the first exemplary embodiment of the present invention.

Thus, when a print request from a document application that conforms to the touch-panel UI 1000 is received when the OS 1053 is running, instead of directly displaying the UI 500 of the printer driver, the OS 1053 automatically generates a UI based on metadata in the XML format, so that the user can easily set the necessary print settings. FIG. 11 illustrates an example of a UI 1101 of an application that conforms to the touch-panel UI 1000 and a UI 1102 for print setting automatically generated by the OS 1053 based on metadata in the XML format according to the present exemplary embodiment.

However, since the UI 1102 is not a module provided by the printer vendor but generated by the OS 1053, the user cannot configure all the print settings which can be provided by the printer driver 1052. In other words, the user confirmation function requesting the user for confirmation of information (e.g., user information, authentication information) before executing the secure print or printing with the departmental management information function is not provided. The user confirmation function displays a pop-up dialog prompting the user to input user information when the user presses a "Print" button 1103. Although the OS 1053 can automatically generate a UI based on the metadata in the XML format, the OS 1053 cannot support such a function of the printer driver 1052.

Thus, if the user desires to use the secure print function or the departmental management function, the user needs to follow the following procedures. First, the user needs to set the secure print function or the departmental management function using the UI screen of the printer driver in the conventional UI environment. Next, as described above, when the user sends out the printing instruction, a pop-up dialog prompting the user to input information needs to be displayed on the desktop UI 900 in the conventional UI environment. However, since the UI displayed on the screen of the monitor 1041 before and after the user sends out the printing instruction is the touch-panel UI 1000, unless the user manually changes the display from the touch-panel UI 1000 to the desktop UI 900 after sending out the printing instruction, the user is unable to know that a pop-up UI is displayed on the screen.

Figure 12:
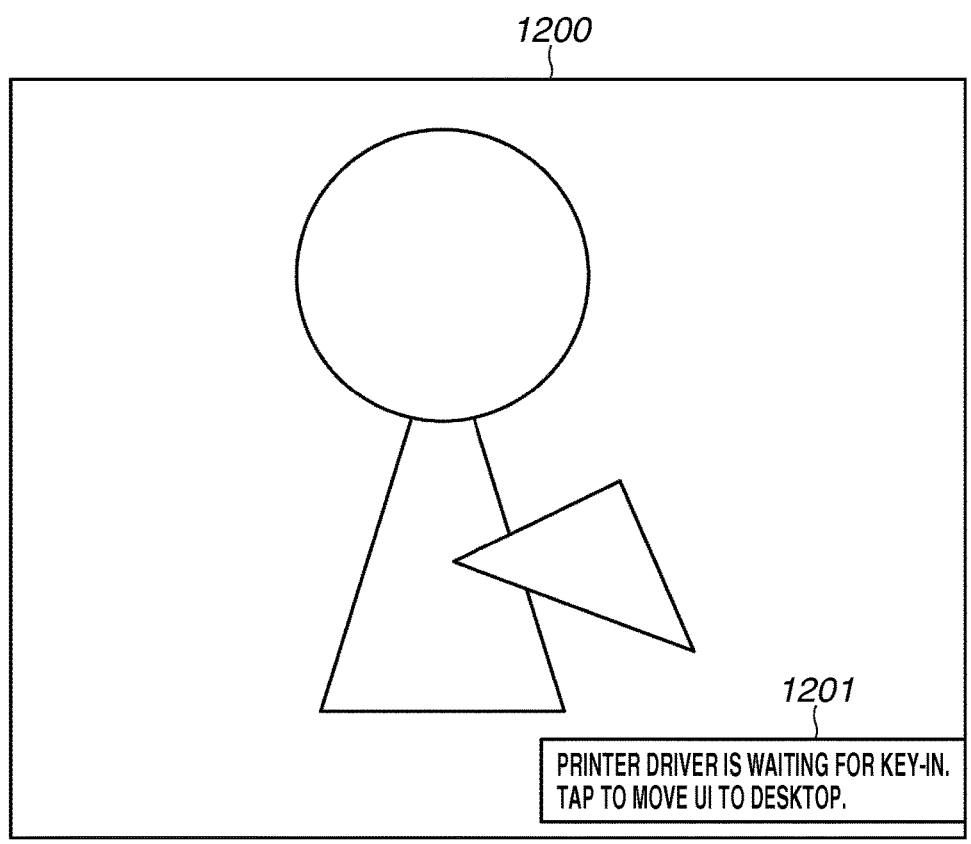
FIG. 12 illustrates an example of a toast for the touch-panel UI according to the first exemplary embodiment of the present invention.

Thus, when the printer driver 1052 displays a pop-up UI on the desktop UI 900 after the instruction of the printing, the OS 1053 displays a toast prompting the user to tap on the touch-panel UI 1000. FIG. 12 illustrates an example of the toast according to the present exemplary embodiment.

In FIG. 12, a toast 1201 is displayed on an application 1200 for a touch-panel UI. The toast 1201 includes a message indicating that the UI can be changed to the desktop UI 900 if the user taps the toast 1201. If the user taps the toast 1201, the OS 1053 changes the display from the touch-panel UI 1000 to the desktop UI 900. Accordingly, the user can notice the pop-up UI displayed on the desktop UI 900, input necessary information, and continue the printing.

However, the display control of the toast 1201 by the OS 1053 needs to be supported not only by the printer driver but by various conventional applications which the OS ensures compatibility. Thus, user confirmation of some of the applications displayed on the desktop UI 900 but not displayed on the touch-panel UI 1000, which is being viewed, may be unnecessary. If the toast 1201 is continuously displayed until it is tapped by the user even if it is not necessary, the display area of the touch-panel UI 1000 will be unnecessarily used.

Normally, the toast 1201 is only a temporary notification displayed by the OS 1053 and disappears after a predetermined period of time. On the other hand, the input of user information is necessary before the function of the printer driver, such as the above-described secure print function and the departmental management function, are executed. Thus, if the user misses the toast 1201, the printer driver 1052 displays a pop-up UI on the desktop UI 900 and waits until the necessary information is input. If the user does not input the necessary information, although the print processing is stopped, the user is unable to know that the print processing is not being performed.

Thus, if the user does not fully understand the display functions of the OS 1053, some functions of the printer driver may not be appropriately executed. According to the information processing apparatus of the present invention, even if the OS supports more than one UI environment such as the OS 1053 does, the user can make full use of the functions of the printer driver.

Figure 6:
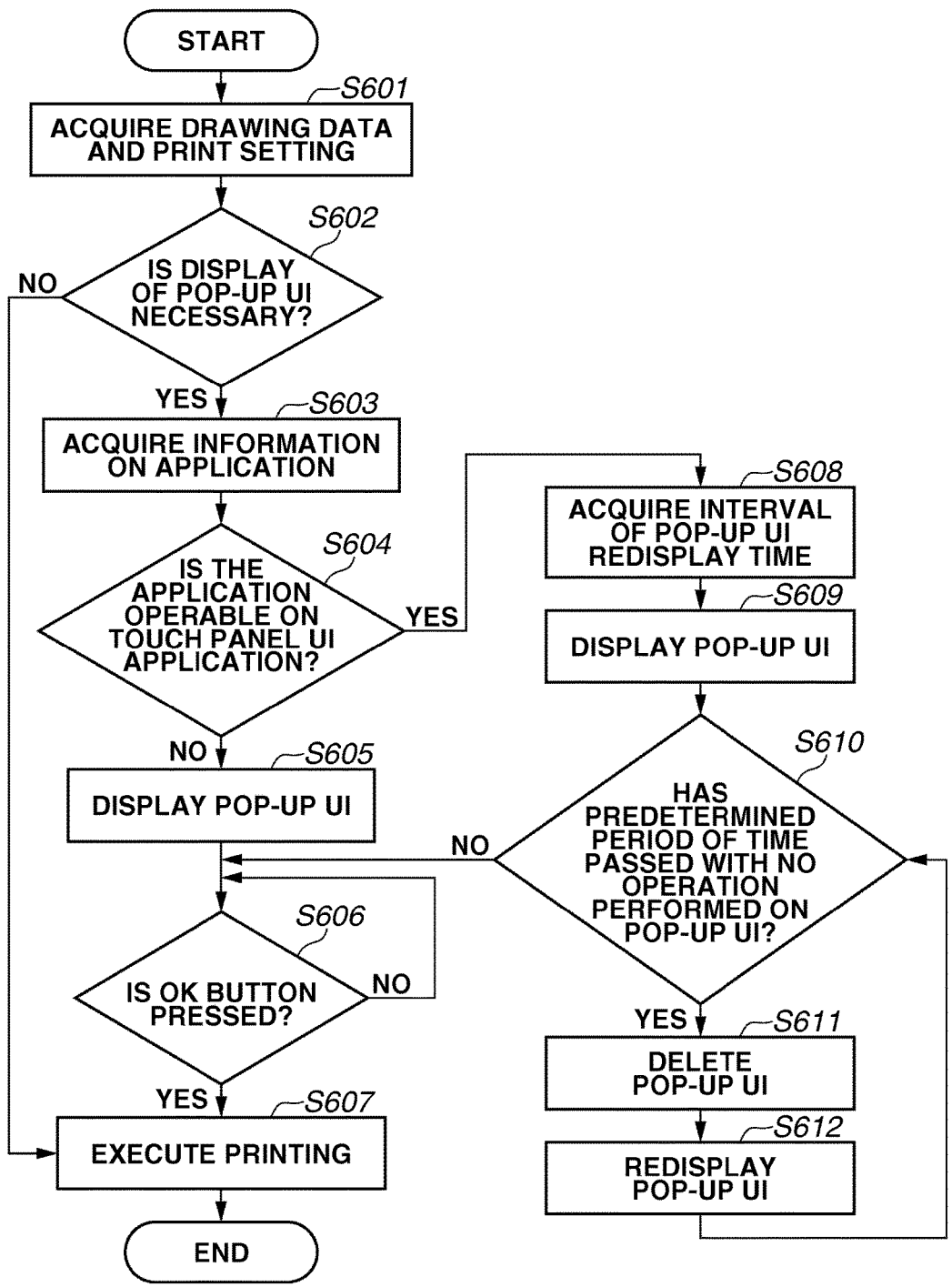
FIG. 6 is a flowchart illustrating print processing using a printer driver according to the first exemplary embodiment of the present invention.

Processing for achieving the above-described aim will be described with reference to the flowchart in FIG. 6. FIG. 6 is a flowchart illustrating the print processing of the printer driver 1052 according to the present exemplary embodiment. The program (i.e., the printer driver) of this processing is stored in the auxiliary storage unit 105 of the client computer, read out to the RAM 1022, and executed by the CPU 101.

The print processing includes prompting the user to input information by displaying a pop-up dialog. In step S601, the printer driver 1052 acquires drawing data 3011 and the print setting 3012 from the application 1051.

In step S602, the printer driver 1052 determines whether the setting for a pop-up dialog prompting the user to input information is included in the print setting 3012 acquired from the application 1051. Such a dialog is displayed when, for example, the "secure print" function is used. When this "secure print" function is used, the user is prompted to input a user name and a password. When the information is input, authentication is performed by the printer. The setting for the pop-up dialog is set in advance via the driver UI illustrated in FIG. 5. In step S602, if the printer driver 1052 determines that the setting for a pop-up dialog prompting the user to input information is not included in the print setting 3012 (NO in step S602), the processing proceeds to step S607 without displaying the pop-up UI. In step S607, the printer driver 1052 converts the print setting 3012 and the drawing data 3011 into PDL data and executes printing. On the other hand, in step S602, if the printer driver 1052 determines that the setting for a pop-up dialog is included in the print setting 3012 (YES in step S602), the processing proceeds to step S603.

In step S603, the printer driver 1052 acquires information on the application which is the print source. For example, the printer driver 1052 acquires the information by requesting reference of identification information of the application from the OS. In step S604, the printer driver 1052 determines whether the application is operable on the touch-panel UI 1000 from the information on the application acquired in step S603. If the printer driver 1052 determines that the application is operable on the touch-panel UI 1000 (YES in step S604), the processing proceeds to step S608. If the printer driver 1052 determines that the application is not operable on the touch-panel UI 1000 (NO in step S604), the processing proceeds to step S605. If the application is operable on the touch-panel UI 1000, the screen illustrated in FIG. 10 or 11 will be displayed.

Figure 7:
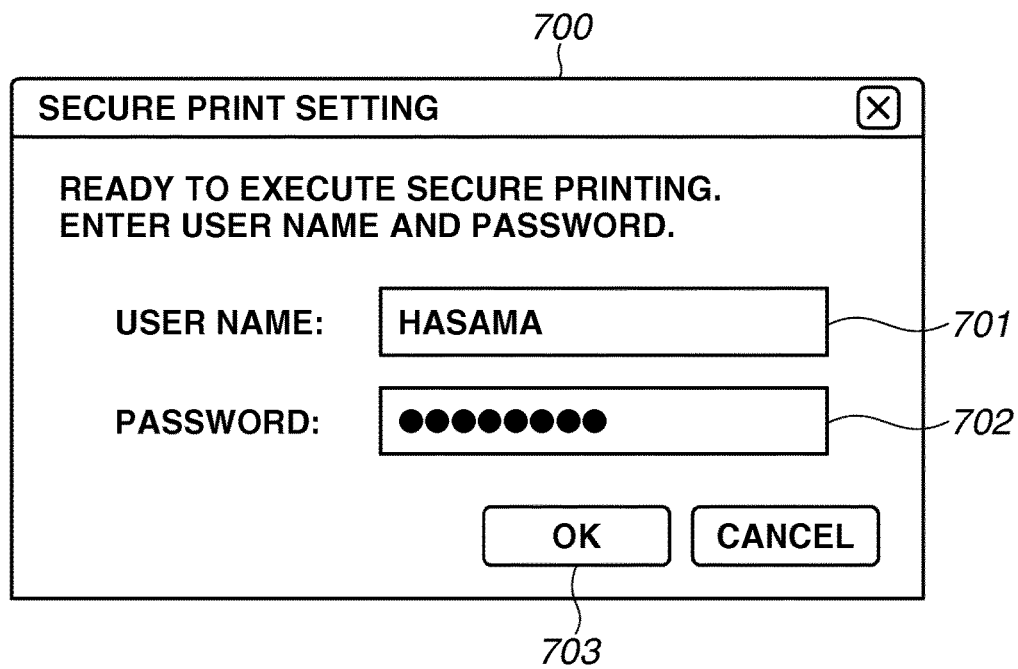
FIG. 7 illustrates an example of a pop-up user interface for secure print according to the first exemplary embodiment of the present invention.

In step S605, the printer driver 1052 displays on the desktop UI 900 a pop-up dialog prompting the user to input information. An example of a UI displaying a pop-up dialog prompting the user to input information (hereinafter, referred to as a pop-up UI) according to the present exemplary embodiment is illustrated in FIG. 7. FIG. 7 illustrates a pop-up UI 700 for the "secure print". Before the secure print is executed, the user is prompted to input a user name 701 and a password 702 so that the printer can perform the authentication before the print product is actually output. In step S606, the printer driver 1052 determines whether the user name 701 and the password 702 have been input and an OK button 703 has been pressed on the pop-up UI 700. In step S606, if the printer driver 1052 determines that the OK button 703 has not yet been pressed (NO in step S606), the printer driver 1052 waits until the OK button 703 is pressed. On the other hand, if the printer driver 1052 determines that the OK button 703 has been pressed (YES in step S606), the processing proceeds to step S607. In step S607, the printer driver 1052 converts the print setting 3012 including the information such as the user name 701 and the password 702 and the drawing data 3011 into PDL data to generate print data. The generated data is transmitted to an image forming apparatus such as a printer, and the data is printed according to the above-described setting.

In step S608, the printer driver 1052 acquires the time required for the next display of the pop-up UI. This time is the time interval of a predetermined time between when the pop-up UI is removed and when the pop-up UI is displayed again on the desktop UI (hereinafter, a pop-up UI redisplay time). This pop-up UI redisplay time may be set in advance to the printer driver 1052 or set by the user via the driver UI in FIG. 5. Further, the printer driver 1052 may acquire the pop-up UI redisplay time from the application as a print source.

In step S609, the printer driver 1052 displays the pop-up UI 700 on the desktop UI 900. At this time, as illustrated in FIG. 12, the toast 1201 used for changing the display from the touch-panel UI to the desktop UI 900 is displayed on the touch-panel UI 1000 by the OS 1053.

In step S610, after displaying the pop-up UI 700 on the desktop UI 900, the printer driver 1052 determines whether the pop-up UI redisplay time has passed with no operation performed on the pop-up UI 700 (with user's operation undetected). If the printer driver 1052 determines that the pop-up UI redisplay time has passed with no operation performed on the pop-up UI 700 (YES in step S610), the processing proceeds to step S611. If the printer driver 1052 determines that operation has been performed within the pop-up UI redisplay time (NO in step S610), the processing proceeds to step S606.

In step S611, the printer driver 1052 deletes the pop-up UI 700 displayed on the desktop UI 900. In step S612, the printer driver 1052 displays the pop-up UI 700 again on the desktop UI 900. At the same time, the toast 1201 illustrated in FIG. 12 is displayed again on the touch-panel UI 1000 by the OS 1053.

According to the processing illustrated in FIG. 6, until an operation is performed on the pop-up UI on the desktop UI 900, that is, until the user operates the pop-up UI 700, the display of the toast 1201 on the screen of the touch-panel UI 1000 is continued. According to the control of the OS 1052, the user is less likely to overlook the toast 1201 regarding the function of, for example, secure print. Thus, even if the user does not fully understand the display function of the OS, the function of the printer driver can be appropriately executed.

Next, a second exemplary embodiment of the present invention will be described. According to the first exemplary embodiment, until the user operates on the pop-up UI on the desktop UI 900, the toast 1201 is displayed on the touch-panel UI 1000. That is, the print processing is executed on the premise that the focus is received on the pop-up UI 700 illustrated in FIG. 7 and the user's operation is performed on the pop-up UI 700. According to the present exemplary embodiment, when the number of redisplay times of the pop-up UI exceeds a predetermined number, the redisplay is stopped and the printing is performed.

Figure 8:
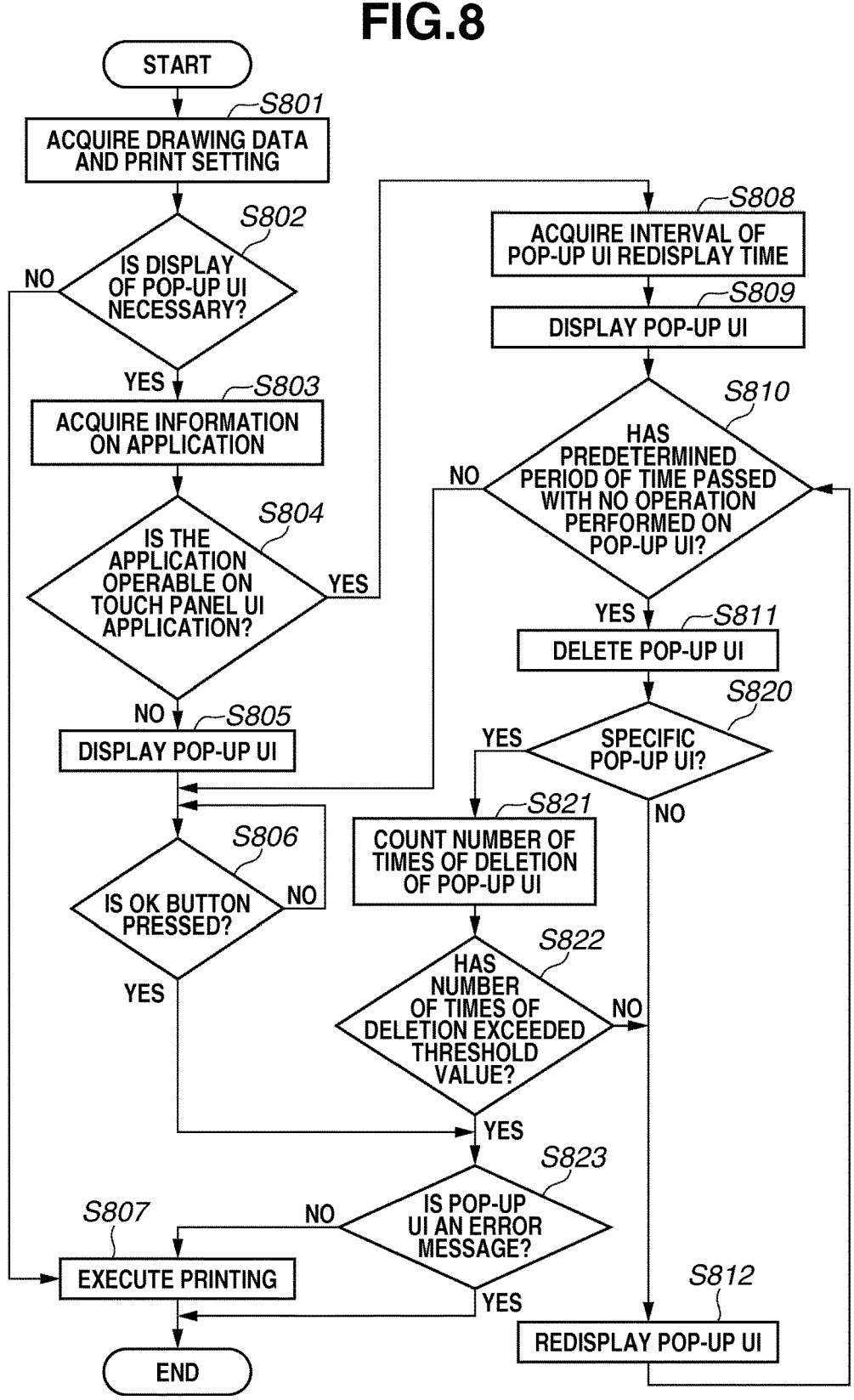
FIG. 8 is a flowchart illustrating print processing according to a second exemplary embodiment of the present invention.

FIG. 8 is a flowchart illustrating the print processing according to the second exemplary embodiment. The program (i.e., the printer driver) of this processing is stored in the auxiliary storage unit 105 of the client computer, read out to the RAM 1022, and executed by the CPU 101.

Since steps S801 to S812 are similar to steps S601 to S612 in FIG. 6, their descriptions are not repeated.

In step S820, the printer driver 1052 determines whether the pop-up UI deleted in step S811 is a specific pop-up UI used for confirmation. If the user presses an OK button on the specific pop-up UI when, for example, an error message is displayed on the screen, the processing proceeds to the next processing. Further, according to the present embodiment, a UI used for confirming information input in advance may be included in the specific pop-up UI. This UI is displayed when a default setting value is set in advance in the input field of the pop-up UI 700 illustrated in FIG. 7. Additionally, a pop-up UI can be arbitrarily registered in advance as the specific pop-up UI for the printer driver 1052.

In step S820, if the pop-up UI is determined as the specific pop-up UI (YES in step S820), the processing proceeds to step S821. If the pop-up UI is not determined as the specific pop-up UI (NO in step S820), the processing proceeds to step S812. In step S812, the printer driver 1052 displays the pop-up UI again on the screen of the desktop UI 900.

On the other hand, in step S821, the printer driver 1052 counts the number of times the pop-up UI has been deleted in step S811. In step S822, the printer driver 1052 determines whether the number of times the pop-up UI has been deleted and acquired in step S821 exceeds a predetermined number. In step S822, if the number is determined to exceed a threshold value (YES in step S822), the processing proceeds to step S823. If the number does not yet exceed the threshold value (NO in step S822), the processing proceeds to step S812.

In step S823, the printer driver 1052 determines whether the pop-up UI deleted in step S811 is a UI associated with print processing which is being processed. If the pop-up UI is not a UI associated with such print processing (for example, the pop-up UI is an error message) (YES in step S823), then the processing ends. Further, if the pop-up UI is associated with print processing which is being processed (NO in step S823), the processing proceeds to step S807. In step S807, the printer driver 1052 executes the subsequent print processing.

According to the processing described with reference to FIG. 8, the print processing can be continued while considering the number of times the pop-up UI has been displayed on the screen of the desktop UI 900 according to the type of the pop-up UI.

According to the above-described exemplary embodiment, although the possibility of the user overlooking the toast 1201 is reduced by the processing of the printer driver 1052, such a possibility can also be reduced by the OS 1053 changing the display time of the toast 1201. In this case, the OS 1053 prepares a setting screen used for changing the display time of the toast 1201 and prompts the user to input the display time. The user can freely set the display time of the toast 1201 via the setting screen.

Further, as a different example, the OS 1053 determines whether printing is being performed. If printing is being performed, the display time of the toast 1201 is automatically increased. If printing is not being performed, the toast 1201 is displayed for a normal display time.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-013040 filed Jan. 25, 2012, which is hereby incorporated by reference herein in its entirety.

The invention claimed is:

1. An information processing apparatus including a processor configured to execute an operating system (OS) providing a first user interface (UI) environment appropriate for a touch panel and a second UI environment different from the first UI environment, and a control program for controlling an image forming apparatus, wherein, as a function of the control program, a pop-up display of a dialog in the second UI environment is performed according to execution of request using a specific function of the control program which cannot be designated on a setting screen of the control program generated by the OS for the first UI environment, the information processing apparatus comprising:

a memory storing instructions; and
a processor which is capable of executing the instructions causing the information processing apparatus to:
in the first UI environment, display a toast prompting a user to change display from the first UI environment to the second UI environment for a predetermined period of time, as a function of the OS, according to the pop-up display of the dialog in the second UI environment; and
set a display time of the toast,
wherein, if a request for the image forming apparatus is performed using the control program in the first UI environment after the specific function in the second UI environment is enabled, a pop-up display of a dialog in the first UI environment is not performed in response to the request, but the pop-up display of the dialog in the second UI environment is performed in response to the request,
wherein, until necessary input is performed to the dialog in the second UI environment, the request for the image forming apparatus on the control program is stopped,
wherein, if the toast displayed based on the set display time in the first UI environment is tapped by the user, a display of the information processing apparatus is changed by the OS from the first UI environment to the second UI environment in which the control program has been performing the pop-up display of the dialog, and wherein data generated by the control program based on the request for the image forming apparatus is transmitted to the image forming apparatus in response to the necessary input having been performed to the dialog in the second UI environment after the display of the information processing apparatus is changed to the second UI environment.

2. The information processing apparatus according to claim 1, wherein the second UI environment is appropriate for input operations by a mouse and a keyboard.

3. The information processing apparatus according to claim 1, wherein the toast is displayed at a lower right in a display unit of the information processing apparatus.

4. The information processing apparatus according to claim 1, wherein the dialog displayed on the pop-up display in the second UI environment includes a dialog for inputting information of at least one of user information, authentication information, department information, file path, and address information.

5. A method for an information processing apparatus including a processor configured to execute an operating system (OS) providing a first user interface (UI) environment appropriate for a touch panel and a second UI environment different from the first UI environment, and a control program for controlling an image forming apparatus, wherein, as a function of the control program, a pop-up display of a dialog in the second UI environment is performed according to execution of request using a specific function of the control program which cannot be designated on a setting screen of the control program generated by the OS for the first UI environment, the method comprising:

displaying, in the first UI environment, a toast prompting a user to change display from the first UI environment to the second UI environment for a predetermined period of time, as a function of the OS, according to the pop-up display of the dialog in the second UI environment; and setting a display time of the toast at a setting screen, wherein, if a request for the image forming apparatus is performed using the control program in the first UI environment after the specific function in the second UI environment is enabled, a pop-up display of a dialog in the first UI environment is not performed in response to the request, but the pop-up display of the dialog in the second UI environment is performed in response to the request, wherein, until necessary input is performed to the dialog in the second UI environment, the request for the image forming apparatus on the control program is stopped, wherein, if the toast displayed based on the set display time in the first UI environment is tapped by the user, a display of the information processing apparatus is changed by the OS from the first UI environment to the second UI environment in which the control program has been performing the pop-up display of the dialog, and wherein data generated by the control program based on the request for the image forming apparatus is transmitted to the image forming apparatus in response to the necessary input having been performed to the dialog in the second UI environment after the display of the information processing apparatus is changed to the second UI environment.

6. A non-transitory computer readable storage medium on which is stored a computer program for making a computer execute a method for an information processing apparatus including a processor configured to execute an operating system (OS) providing a first user interface (UI) environment appropriate for a touch panel and a second UI environment different from the first UI environment, and a control program for controlling an image forming apparatus, wherein, as a function of the control program, a pop-up display of a dialog in the second UI environment is performed according to execution of request using a specific function of the control program which cannot be designated on a setting screen of the control program generated by the OS for the first UI environment, the method comprising:

displaying, in the first UI environment, a toast prompting a user to change display from the first UI environment to the second UI environment for a predetermined period of time, as a function of the OS, according to the pop-up display of the dialog in the second UI environment; and setting a display time of the toast at a setting screen, wherein, if a request for the image forming apparatus is performed using the control program in the first UI environment after the specific function in the second UI environment is enabled, a pop-up display of a dialog in the first UI environment is not performed in response to the request, but the pop-up display of the dialog in the second UI environment is performed in response to the request, wherein, until necessary input is performed to the dialog in the second UI environment, the request for the image forming apparatus on the control program is stopped, wherein, if the toast displayed based on the set display time in the first UI environment is tapped by the user, a display of the information processing apparatus is changed by the OS from the first UI environment to the second UI environment in which the control program has been performing the pop-up display of the dialog, and wherein data generated by the control program based on the request for the image forming apparatus is transmitted to the image forming apparatus in response to the necessary input having been performed to the dialog in the second UI environment after the display of the information processing apparatus is changed to the second UI environment.

* * * * *